US012580884B2

(12) United States Patent
Tian et al.

(10) Patent No.: US 12,580,884 B2
(45) Date of Patent: Mar. 17, 2026

(54) METHODS AND SYSTEMS FOR VALIDATING INGRESS TRAFFIC AND/OR RESPONSE THERETO IN A COMPUTER NETWORK

(71) Applicant: Lemon Inc., Grand Cayman (KY)

(72) Inventors: Zhipeng Tian, Culver City, CA (US); Zhengqin Luo, Los Angeles, CA (US); Mu Du, Culver City, CA (US); Joohwi Lee, Culver City, CA (US); Chongxin Luo, Culver City, CA (US); Sen Wang, Culver City, CA (US); Jianqing Zhang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 31 days.

(21) Appl. No.: 18/456,952

(22) Filed: Aug. 28, 2023

(65) Prior Publication Data

US 2025/0080495 A1     Mar. 6, 2025

(51) Int. Cl.
*H04L 9/40* (2022.01)
*H04L 67/568* (2022.01)
*H04L 67/02* (2022.01)

(52) U.S. Cl.
CPC ...... *H04L 63/0227* (2013.01); *H04L 63/0281* (2013.01); *H04L 67/568* (2022.05); *H04L 67/02* (2013.01)

(58) Field of Classification Search
CPC . H04L 63/0227; H04L 63/0281; H04L 67/02; H04L 67/568
See application file for complete search history.

(56) References Cited

U.S. PATENT DOCUMENTS

| | | | |
|---|---|---|---|
| 2011/0283359 A1 | 11/2011 | Prince et al. | |
| 2013/0291088 A1 | 10/2013 | Shieh et al. | |
| 2016/0028855 A1* | 1/2016 | Goyal | H04L 67/51 |
| | | | 709/203 |
| 2019/0020723 A1 | 1/2019 | Kumar et al. | |
| 2019/0098106 A1* | 3/2019 | Mungel | H04L 67/564 |
| 2021/0096979 A1* | 4/2021 | Fasheh | G06F 11/3684 |
| 2023/0110111 A1* | 4/2023 | Royal | H04L 63/20 |
| | | | 726/1 |
| 2023/0247006 A1 | 8/2023 | Pemmaraju et al. | |
| 2025/0039056 A1* | 1/2025 | Singh | H04L 41/0894 |

OTHER PUBLICATIONS

Extended European Search Report for European Application No. 24195056.7, mailed Nov. 28, 2024, 9 pages.

* cited by examiner

*Primary Examiner* — Gil H. Lee
(74) *Attorney, Agent, or Firm* — Fish & Richardson P.C.

(57) ABSTRACT

A security gateway for validating ingress traffic and/or a response to the ingress traffic in a computer network, and a method for validating the same. The security gateway includes a proxy server and a gateway agent. The proxy server receives the ingress traffic and/or the response and forwards the ingress traffic and/or the response to the gateway agent. The gateway agent validates the ingress traffic and/or the response as valid ingress traffic and/or valid response or invalid ingress traffic and/or invalid response based on predetermined validation requirements. The proxy server further receives the valid ingress traffic from the gateway agent and forwards the valid ingress traffic to a backend service and/or receives the valid response from the gateway agent and forwards the valid response to a client device or blocks the invalid ingress traffic and/or invalid response.

14 Claims, 6 Drawing Sheets

METHODS AND SYSTEMS FOR VALIDATING INGRESS TRAFFIC AND/OR RESPONSE THERETO IN A COMPUTER NETWORK

FIELD

The embodiments described herein pertain generally to computer network systems. Specifically, the embodiments described herein pertain to methods and systems for providing data security and privacy for users of an online platform, and more specifically, methods and systems for a security and/or application gateway to validate ingress traffic and/or a response to the ingress traffic.

BACKGROUND

Online platforms, such as networking platforms, media platforms, gaming platforms, or the like, may be used to connect users in a computer network, e.g., to connect users of the online platform together. The users may connect to the online platforms via a gateway or network gateway that is configured to allow a flow of ingress traffic and/or a response to the ingress traffic to/from the online platform. The ingress traffic and/or the response to the ingress traffic may contain protected information, e.g., information used for authentication, information protected by laws, regulations, or organizational policies, or the like.

SUMMARY

Currently, online platforms do not have the appropriate or necessary data security and privacy protection of the protected information contained in or sent with the ingress traffic and/or response to the ingress traffic over the computer network system.

Features in embodiments described herein may provide for data security and privacy protection of the protected information in the ingress traffic and/or response to the ingress traffic by using a security gateway that serves as centralized place to gather all traffic, e.g., takes all online traffic from the users, e.g., connected to the online platform, and apply assurance checks on the online traffic. In an embodiment, the security and/or application gateway is configured to validate the ingress traffic and/or the response to the ingress traffic to allow or block the transmission of the same. As such, the security and/or application gateway may be configured to provide data security and privacy protection so that protected information is not brought in or brought out of the online platform, e.g., demonstrates and ensures privacy policy enforcement.

For example, when considering the data center and/or backend services on the server as a building that belongs to an owner or operator, the owner or operator may open some doors of the building for information (from a client) to enter and/or to exit the building (to the client), and that the owner or operator may work with a third party partners to e.g., "hire security guards" to protect the building so that no one can bring in and/or take out protected information. The way to achieve this is to cut-off all the access to the data center and/or backend services on the server except for some channels with security and/or privacy gateways, and such gateways may be deployed in a neutral environment owned by the owner/operator and the third party partners together to provide the enforcement of data security and privacy policies.

In one example embodiment, a security gateway for validating ingress traffic in a computer network system is provided. The security gateway includes a proxy server; and a gateway agent. The proxy server is configured to receive the ingress traffic and to forward the ingress traffic to the gateway agent, the gateway agent is configured to validate the ingress traffic as valid ingress traffic or invalid ingress traffic based on predetermined validation requirements, and the proxy server is further configured to receive the valid ingress traffic from the gateway agent and forward the valid ingress traffic to a backend service or block the invalid ingress traffic.

In another embodiment, a security gateway for validating a response to ingress traffic in a computer network system is provided. The security gateway includes a proxy server; and a gateway agent. The proxy server is configured to receive the response to the ingress traffic from a backend service as a response to an ingress traffic request from a client device and to forward the response to the ingress traffic to the gateway agent, the gateway agent is configured to validate the response to the ingress traffic as a valid response to the ingress traffic or invalid response to the ingress traffic based on predetermined validation requirements, and the proxy server is further configured to receive the valid response to the ingress traffic from the gateway agent and forward valid response to the ingress traffic to the client device or block the invalid response to the ingress traffic.

In yet another embodiment, an ingress traffic validation system for a computer network system is provided. The ingress traffic validation system includes a security gateway including a proxy server and a gateway agent; and a load balancer. The proxy server is configured to receive the ingress traffic from a client device and to forward the ingress traffic to the gateway agent, the gateway agent is configured to validate the ingress traffic as valid ingress traffic or invalid ingress traffic based on predetermined validation requirements, and the proxy server is further configured to receive the valid ingress traffic from the gateway agent and forward the valid ingress traffic to the load balancer or block the invalid ingress traffic.

In still yet another embodiment, a method for validating ingress traffic in a computer network system is provided. The method includes receiving, by a proxy server, the ingress traffic from a client device; forwarding, by the proxy server, the ingress traffic to a gateway agent; validating, by the gateway agent, the ingress traffic as valid ingress traffic or invalid ingress traffic based on predetermined validation requirements; receiving, by the proxy server, the valid ingress traffic or invalid ingress traffic from the gateway agent; and forwarding, by the proxy server, the valid ingress traffic to a backend service or blocking the invalid ingress traffic.

In yet another embodiment, a non-transitory computer-readable medium having computer-executable instructions stored thereon is provided. The computer-executable instructions that, upon execution, cause one or more processors to perform operations including receive, by a proxy server, ingress traffic from a client device and/or a response to the ingress traffic from a backend service; forward, by the proxy server, the ingress traffic and/or the response to the ingress traffic to a gateway agent; validate, by the gateway agent, the ingress traffic and/or the response to the ingress traffic as valid ingress traffic and/or valid response to the ingress traffic or invalid ingress traffic and/or invalid response to the ingress traffic based on predetermined validation requirements; receive, by the proxy server, the valid ingress traffic and/or valid response to the ingress traffic or invalid ingress traffic and/or invalid response to the ingress traffic from the gateway agent; and forward, by the proxy server, the valid ingress traffic to the backend service and/or forward the valid response to the ingress traffic to the client device or block the invalid ingress traffic and/or invalid response to the ingress traffic.

As such, security gateways for all online traffic from users are provided for data security and privacy protection of the protected information in the ingress traffic and/or response to the ingress traffic. That is the security gateways may be used to monitor traffic passing though proxy servers and/or load balancers and inspect the ingress traffic and/or response to the ingress traffic to ensure compliance with any officially declared schema, e.g., data formats. In some embodiments, the security gateways may be owned and/or operated by third parties who may be trusted technology partners to manage the inspection process, e.g., independently operated third parties who are separately controlled from the online platform owner, to ensure independence and security.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
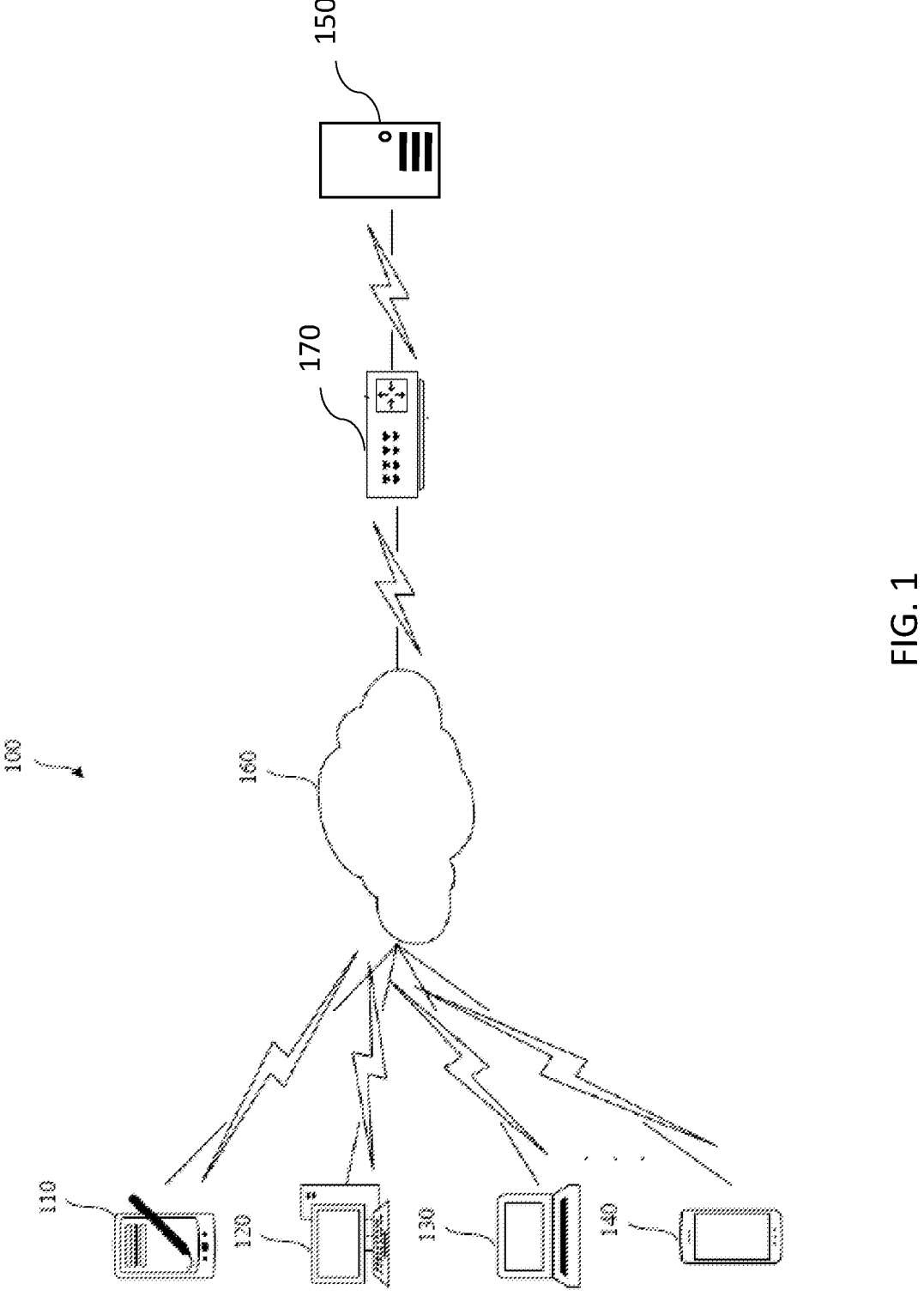
FIG. 1 is a schematic view of an example computer network system for ingress traffic validation, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps or modules. It should be appreciated that such functional blocks or modules may be realized by any number of hardware and/or software components configured to perform the specified functions, for example, when executed by a processor-enabled computing device.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "network" or a "computer network system" is a term of art and may refer to interconnected computing devices that may exchange data and share resources with each other. It is to be understood that the networked devices may use a system of rules (e.g., communications protocols, etc.), to transmit information over wired or wireless technologies.

As referenced herein, a "packet", "data packet", "network packet", or "network data packet" in a computer network system is a term of art and may refer to a formatted unit of data carried by a computer network system. It is to be understood that a packet may include control information and user data. User data may refer to the "payload". Control information may provide information for delivering the payload (e.g., source and destination network addresses, error detection codes, sequencing information, etc.). It is also to be understood that control information typically may be stored in packet headers and/or trailers. It is further to be understood that control information may include metadata. Metadata in computer networking may refer to descriptive information about the user data, or "data about the data." Metadata may carry individual traits pertaining to the structure of communications protocols and the packets.

As referenced herein, a "header" of a packet may refer to an initial portion of the packet. It is to be understood that a header may contain control information such as addressing, routing, protocol version, etc. The format of the header information may depend on the communications protocol being used. For example, in the Open Systems Interconnection (OSI) model (the model used in the embodiments disclosed herein) from the International Organization for Standardization (ISO), the communications in a computer networking system may be split into different layers: a physical layer (L1), a data link layer (L2), a network layer (L3), a transport layer (L4), a session layer (L5), a presentation layer (L6), and an application layer (L7). In another example, the Transmission Control Protocol/Internet Protocol (TCP/IP) model may include a physical layer (L1), a data link layer (L2), an Internet layer (L3), a transport layer (L4), and an application layer (L5). Each layer may have its own communications protocol. For example, an L2 header may contain fields such as destination media access control (MAC) address, source MAC address, etc.

As referenced herein, "traffic", "traffic flow", or "network flow" in a computer network system may refer to data (e.g., a sequence of packets, etc.) from a source computer or device to a destination computer or device, which may be another host, a multicast group, or a broadcast domain. It is to be understood that a traffic may include all packets in a specific transport connection and/or a media stream, and may include a set of packets passing an observation point in the network during a certain time interval.

As referenced herein, "ingress traffic" may refer to network traffic that originates from outside an online platform and proceeds to a backend inside a computer network system, e.g., a backend service for an online platform. It is to be understood that ingress traffic includes requests that flow from outside the online platform to the online platform and/or backend services and/or responses (e.g., acknowledgments, answer to the requests, etc.) corresponding to the requests. The ingress traffic may include one or more of a path, parameters, header, request, query, cookie, body, payload, or the like. That is, the ingress traffic includes the request from a client (e.g., made to get or retrieve information from a server, e.g., online platform) to the online platform, e.g., data center and/or backend services, and the backend services' response (e.g., from the server) that corresponds to the request from the client (e.g., as a response to the request from the client).

As referenced herein, a "proxy" or a "proxy server" in a computer network system is a term of art and may refer to an application or a computer device that acts as an intermediary between a client requesting a resource or a service and a server providing that resource or service. The proxy server may include a load balancer that is configured to distribute the requests or tasks over the set of resources, e.g., backend services of the online platform, to increase efficiency of the computer network system and/or a gateway, as discussed herein. In another embodiment, the load balancer may be independent to or separated from the proxy server.

As referenced herein, "response to the ingress traffic" may refer to network traffic that is a response to a request in the ingress traffic. The response to the ingress traffic may originate from the online platform, e.g., backend service, of the computer network system, and sent or otherwise exits the backend service, e.g., to the client device. The response to the ingress traffic may include one or more of a path, parameters, headers, body, payload, or the like.

As referenced herein, "protected information" may refer to private information that may not be broadly known or disseminated to safeguard the privacy or security of an individual or entity. Protected information may include personal identifying information (e.g., medical information, financial information, user identifications, etc., such as user's name, e-mail address, phone numbers, user's unique ID, etc.), business information, or other protected information.

As referenced herein, a "gateway" or a "network gateway" in a computer network system is a term of art and may refer to a device that connects disparate networks by translating communications from one communication protocol to another. It is to be understood that a gateway may refer to a piece of networking hardware used in telecommunications networks that allows data to flow from one discrete network to another. It is also to be understood that a gateway may also refer to a computer program configured to perform the tasks of a gateway hardware. It is further to be understood that gateways may communicate using more than one protocol to connect multiple networks and can operate at any of the seven layers of the open systems interconnection model (OSI). In an example embodiment, a gateway may refer to a network device used in telecommunications that connects two networks with different transmission protocols together. That is, a gateway may provide a connection between two networks, and the networks do not need to use the same network communication protocol. It is to be understood that gateways may serve as an entry and exit point for a network as all data must pass through or communicate with the gateway prior to being routed.

As referenced herein, "application gateway" or "gateway agent" may refer to a gateway connected to an online platform for monitoring all of the traffic of users of the online platform (e.g., end users and external developers/partners). The application gateway or gateway agent may further be configured to processes incoming/outgoing data according to the data security assurance requirements, e.g., by fetching the data labels for the application programing interface (API) being accessed and validating data access and sharing behaviors against privacy polic(ies).

As referenced herein, the term "online platform" may refer to a system or architecture for connecting a plurality of users, for example, including, but not limited to, social networking platforms, social media platforms, online shopping platforms, banking platforms, home security platforms, entertainment platforms, education platforms, gaming platforms, or the like.

As referenced herein, "backend service" may refer to services that provide functionality to the backend of an application, e.g., for the online platform. For example, the backend services may include, but not limited to, data storage, query/search functions, user authorization, file storage and sharing, user management, push notifications, integration with other applications, usage analysis, running business logic, messaging/chat functions, and the like. The backend services may be provided using software development kits, application programming interfaces, or the like.

As referenced herein, a "module" may refer to a network, algorithm, programs, software, hardware, or any combination thereof configured or otherwise provided to perform the recited function.

Features in embodiments described herein may provide for data security and privacy protection of the protected information in the ingress traffic and/or response to the ingress traffic by using a security gateway that is configured to take all online traffic to/from the clients/users, e.g., connected to the online platform, and apply assurance checks on the online traffic. In an embodiment, the security gateway is configured to validate the ingress traffic and/or the response to the ingress traffic from the online platform, e.g., backend service, to allow or block the transmission of the same. As such, the security gateway may be configured to provide data security and privacy protection so that protected information is not brought in or brought out of the online platform.

That is, the security gateway is configured to limit access to the online platform, e.g., on web-hosted data centers, by cutting off most and/or all access to the online platform except through some channels that have the data security and privacy protection. In some embodiments, a neutral third party may be used to enforce the data security and privacy policies of the security gateway, in which the neutral third party is independent to and/or separated from the online platform, e.g., not under the control of the owners or operators of the online platform.

As such, the embodiments discussed herein are directed to materially improving data security and privacy protection as discussed further herein.

FIG. 1 is a schematic view of a computer network system for validating ingress traffic and/or a response to the ingress traffic according to an embodiment.

The system 100 may include terminal devices 110, 120, 130, and 140, a network 160, a gateway or router 170, and a server 150. It is to be understood that FIG. 1 only shows illustrative numbers of the terminal devices, the network, the gateway, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices. The terminal devices 110, 120, 130, and 140 may include an application (or application programing interface (API) connection), web-accessing program, e.g., browser, or other Internet enabled program for accessing the server 150 for transmitting and/or receiving data from the server 150. The terminal devices 110, 120, 130, and 140 may also include security programs, access keys, encryption programs, or the like to be able to access the online platform on the server 150, e.g., a backend service, such as, for a social networking platform, a social media platform, online shopping platforms, banking platforms, home security platforms, entertainment platforms, education platforms, and/or a gaming platform (herein referred to collectively as "online platform") to access, upload, download, view data, and/or the like.

In accordance with at least some example embodiments, the network 160 may be a medium used to provide a communications link between the terminal devices 110, 120, 130, 140, the gateway 170, and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140, for example, for hosting the online platform and/or the backend service(s). The server 150 may be implemented by a distributed server cluster including multiple servers or may be implemented by a single server. The server 150 may be accessed via the gateway and/or proxy server 170 that is configured to receive the request from the client and distribute the request to the server 150, e.g., the backend services.

A user or client may use one or more of the terminal devices 110, 120, 130, and 140 to interact with the server 150 via the network 160 and gateway 170. Various applications or localized interfaces thereof, such as social networking or media applications, online shopping platforms, banking platforms, home security platforms, entertainment platforms, education platforms, gaming applications, or the like, may be installed on the terminal devices 110, 120, 130, and 140. The user may use the online platform for networking, socializing, gaming, shopping, browsing, searching, or the like. Each user may be associated with a user profile that includes personal identifying information, such as, user name, email address, phone number, home address, banking information, or other protected information. In some embodiments, the user or client may be a restricted employee who may have limited access to the ingress traffic and response thereto.

It is to be understood that software applications or services according to the embodiments described herein and/or according to the services provided by the service providers may be performed by the server 150, the gateway 170, and/or the terminal devices 110, 120, 130, and 140 (which may be referred to herein as user devices). Accordingly, the apparatus for the software applications and/or services may be arranged in the server 150, the gateway 170 and/or in the terminal devices 110, 120, 130, and 140.

It is also to be understood that when a service is not performed remotely, the system 100 may not include the network 160, but include only the terminal device 110, 120, 130, and 140, the gateway 170, and/or the server 150.

It is further understood that the terminal device 110, 120, 130, and 140, the gateway 170, and/or the server 150 may each include one or more processors, a memory, and a storage device storing one or more programs. The terminal device 110, 120, 130, and 140, the gateway 170, and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

While prior online platforms may use gateways 170 configured to allow users to access the online platforms on the server 150, the prior gateways do not have the appropriate or necessary data security and privacy protection of the protected information contained in or sent with the ingress traffic and/or response to the ingress traffic over the computer network system. The methods and systems described herein may provide for data security and privacy protection of the protected information in the ingress traffic and/or response to the ingress traffic by using a security gateway that is configured to take all online traffic from the users, e.g., connected to the online platform, and apply assurance checks on the online traffic. For example, in an embodiment, the security gateway may be configured to validate the ingress traffic and/or the response to the ingress traffic to allow or block the transmission of the same. As such, the security gateway may be configured to provide data security and privacy protection so that protected information is not brought in or brought out of the online platform.

Figure 2:
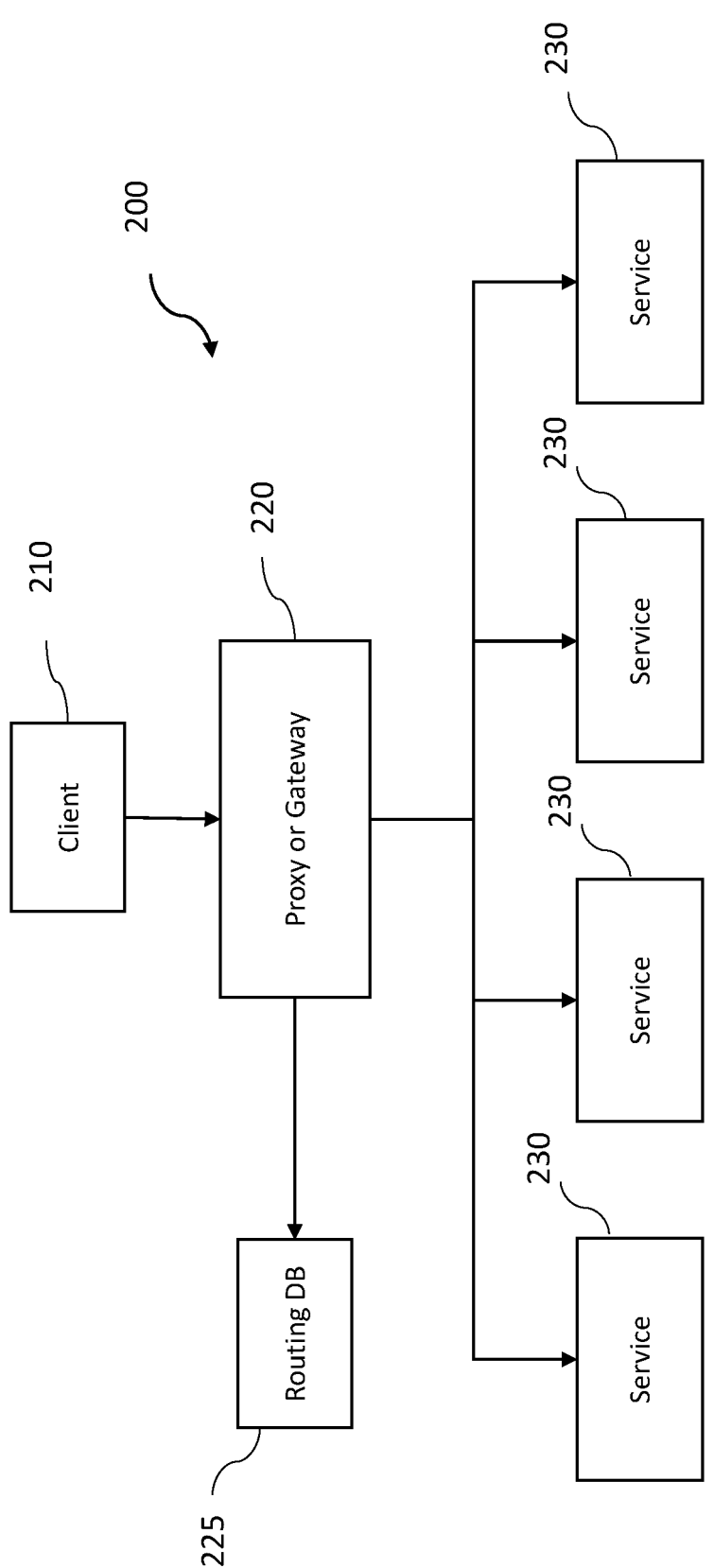
FIG. 2 is a schematic view of a system architecture for ingress traffic validation, arranged in accordance with at least some embodiments described herein.

FIG. 2 is an illustrative embodiment of a general system architecture 200, e.g., computer network system, for the flow of ingress traffic in a computer network system, as described herein. The system architecture 200 may include a client 210, a proxy server or gateway 220, and backend service(s) 230, e.g., for the online platform that is stored at a datacenter or server hosting the online platform and/or backend service(s) 230. In an example embodiment, the proxy server or gateway 220 may be the gateway 170 of FIG. 1.

The client 210 may be a user of a terminal device, e.g., 110, 120, 130, 140 of FIG. 1, in which an application or API, web-accessing program, or other Internet enabled program (web or mobile) may be used for accessing the server, e.g., 150, which hosts and/or stores the backend service(s) 230, e.g., for the online platform, for example, at a datacenter. The client 210 may send a request to the online platform, e.g., to the backend service(s) 230, for accessing, download-ing, uploading, querying/searching, authorizing, managing, pushing notifications, integrating with other applications, analyzing usage, running business logic, messaging/chat functions, and/or viewing data from the online platform.

The proxy server 220 may be a proxy, gateway, and/or a load balancer that is configured to receive the request from the client 210 and distribute and/or forward network or application traffic, e.g., ingress traffic and response to the ingress traffic, from the client 210 to the backend service(s) 230 and from the backend service(s) 230 to the client(s) 210. The proxy server 220 may also be configured to translate the domain and path of the request from the client 210 by finding the corresponding internet protocol (IP) via a routing database 225. The routing database 225 may include storage on a non-volatile storage medium of the IP protocols and/or the service name and cluster name from the request and may be accessed using an access control list token, e.g., to specify which clients or users may be able to access the routing database 225. In some embodiments, transport layer security may be used to access the routing database 225, e.g., cryptographic protocol that provides security of data sent between the client 210 and the routing database 225. In some embodiments, the proxy server 220 may be or included in a security gateway, as discussed further herein.

The backend service(s) 230 for the online platform may operate behind the proxy server 220 and may be identified on the server, e.g., 150 of FIG. 1, and/or at a datacenter by the IP address and/or service name and cluster name trans-lated from the request from the client 210, e.g., via the routing database 225. The backend service(s) 230 for the online platform may be configured to provide services to the client(s) 210, e.g., for accessing, downloading, uploading, querying/searching, authorizing, managing, pushing notifi-cations, integrating with other applications, analyzing usage, running business logic, messaging/chat functions, and/or viewing data from the online platform. In some embodi-ments, the backend service(s) 230 may reply on tools or APIs to provide or support the backend service(s) provided by the online platform. In some embodiments, the proxy server 220 may be configured to translate the ingress traffic, e.g., request in the ingress traffic of the uniform resource locator (URL), into a corresponding backend service(s) 230 locator, which may include the service name, cluster name, environment name, and/or region. In some embodiments, the request may include tokens representing the service name, cluster name, environment name, and/or region. Each token may be separated to provide identification of the respected tokens, such that the backend service(s) 230 may be identified or pinpointed, and the proxy server 220 may be configured to retrieve the IP endpoints (e.g., IP address and ports) from the routing database 225. The proxy server 220 may then be configured to direct the request in the ingress traffic to the identified IP endpoints, e.g., a URL-to-backend locator mapping.

Figure 3:
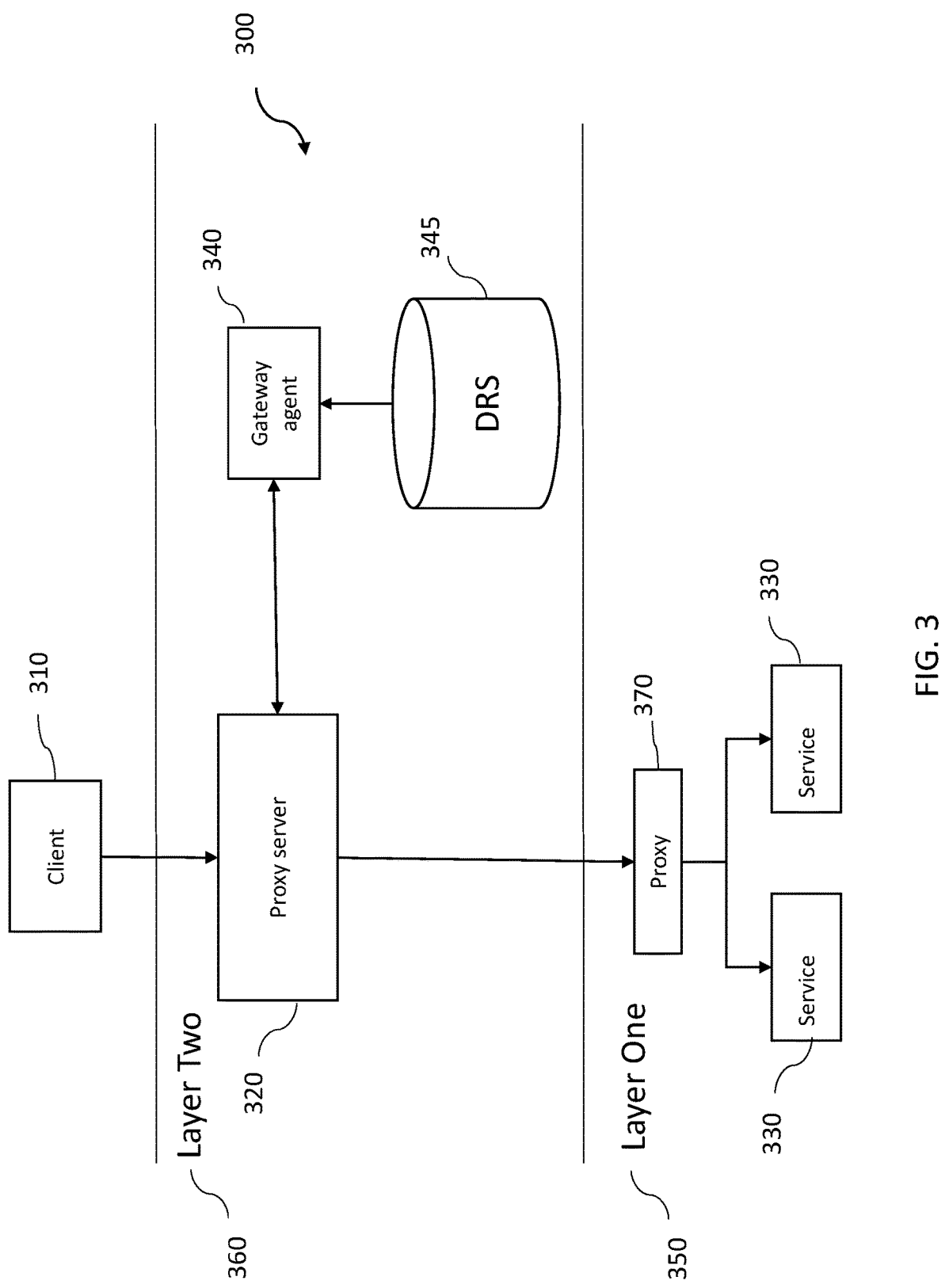
FIG. 3 is a schematic view of an example ingress traffic validation system, arranged in accordance with at least some embodiments described herein.

FIG. 3 is a schematic view of an example ingress traffic validation system 300, which may be a computer network system having the same or similar features of the computer network system 100 of FIG. 1 or the system architecture 200 of FIG. 2. The ingress traffic validation system 300 may include a two-layer architecture for accessing the backend service(s) 330 for the online platform, in which the ingress traffic validation system 300 has the necessary security and privacy protection of protected information, e.g., of the client and/or the system. The two-layer architecture may include a first layer (Layer One 350) and a second layer (Layer Two 360), which may be a security gateway. In some embodiments, the first layer 350 may be owned and/or operated by the owner/operator of the online platform, e.g., including the backend service(s). In some embodiments, the second layer 360 maybe owned and/or operated by a third-party provider, e.g., a trusted third-party in a neutral or trusted environment that is independently operated and/or separately controlled from the owner/operator of the online platform.

The ingress traffic validation system 300 may include client(s) 310, the Layer Two 360 service which may be the security gateway (referenced herein as "security gateway") may include a proxy server 320 and a gateway agent 340, and the Layer One 350 service may include a proxy server 370 and backend service(s) 330 for the online platform.

The client(s) 310 may be a user(s) of a terminal device, e.g., 110, 120, 130, 140 of FIG. 1 and/or client 210 of FIG. 2, in which an application or API, web-accessing program, or other Internet enabled program (web or mobile) may be used for accessing the server, e.g., 150, which hosts and/or stores the backend service(s) 330, e.g., for the online plat-form, for example, at a datacenter. The client(s) 310 may send a request to the online platform, e.g., to the backend service(s) 330, for accessing, downloading, uploading, que-rying/searching, authorizing, managing, pushing notifica-tions, integrating with other applications, analyzing usage, running business logic, messaging/chat functions, and/or viewing data from the online platform.

The proxy server 320 of the security gateway may be a proxy (and/or reverse proxy), gateway, and/or a load bal-ancer that is designed, programmed, or otherwise configured to receive the ingress traffic, e.g., including a request, payload in the request, or other data, from the client(s) 310 and distribute and/or forward the ingress traffic from the client(s) 310 to the Layer One services, e.g., the Layer One proxy server 370 and the backend service(s) 330, and from the backend service(s) 330 to the client(s) 310, e.g., a response to the ingress traffic. The proxy server 320 may also be configured to redirect the ingress traffic (and/or response thereto) to the gateway agent 340 and receive the ingress traffic (and/or response thereto) and/or a result of the validation (as discussed further below). In some embodi-ments, the proxy server 320 may be configured to translate the domain and path of the request from the client(s) 310 by finding the corresponding internet protocol (IP) via a routing database. In some embodiments, transport layer security may be used to access the routing database, e.g., cryptographic protocol that provides security of data sent between the client(s) 310 and the routing database. In some embodiments, the proxy server 320 may be configured to block the ingress traffic when marked/labeled as being invalid traffic.

The gateway agent 340 of the security gateway may be designed, programmed, or otherwise configured to be in communication with the proxy server 320 and receive all online traffic (such as ingress traffic), e.g., including requests and/or responses, to/from the clients connected to the online platform, parse the online traffic, e.g., every data field and/or identify any key-value pairs, based on the format of the online traffic, such as Hypertext Transfer Protocol (HTTP) format, JavaScript Object Notation (JSON) format, Extensible Markup Language (XML) format, etc., and apply assurance checks on the online traffic, e.g., validation. In some embodiments, the online traffic may be size limited, e.g., the gateway agent 340 may only receive ingress traffic of 1 GB, 500 MB, 100 MB, 50 MB or smaller. In some embodiments, large file sizes, e.g., 500 MB, 1 GB, 500 GB, 1 TB may be parsed into smaller data packets. In other embodiments, any metadata associated with the large files may only be sent to the gateway agent 340, e.g., text related data, such as, video name, video comments, or the like.

In an embodiment, the gateway agent 340 may be configured to validate the parsed data based on predetermined validation requirements, e.g., to allow or block the transmission of the same. For example, if a request (and/or its response) in the ingress traffic matches one of the predetermined validation requirements (that is, the schema of the request and/or its response is registered with the gateway agent 340), the gateway agent 340 may validate or mark/label the ingress traffic as valid traffic. If a request (and/or its response) in the ingress traffic does not match any one of the predetermined validation requirements (that is, the request and/or its response is not registered with the gateway agent 340), the gateway agent 340 may invalidate or mark/label the ingress traffic as invalid traffic. In some embodiments, the gateway agent 340 may be designed, programmed, or otherwise configured to store inspection logs, and return the result of the validation, e.g., pass or block, and/or the ingress traffic to the proxy server 320. In some embodiments, in which the online traffic, e.g., ingress traffic, includes the request and response exchanged between the client(s) 310 and the backend service(s) 330, in which both the request and the response undergo inspection, the gateway agent 340 may be configured to temporarily store the request from the client(s) 310, e.g., as metadata, until the backend response from the backend service(s) 330 is received, e.g., for coordination of the request and response, for example, until the response to the request is received. In other embodiments, the validation process on the request and response are performed separately (e.g., upon receiving the request or the response).

In some embodiments, the gateway agent 340 may include an application gateway agent and/or an operations gateway agent, e.g., for connecting the client(s) 310 (or operator) to the application services, e.g., backend service(s) 330, for the online platform. The application gateway agent may be designed, programmed, or otherwise configured to validate application traffic, e.g., ingress traffic and/or response from an API associated with the online platform, from the client(s) 310. For example, in an embodiment, when the client(s) 310 is an API for live streaming, the client(s) 310 may be configured to send a message to the backend service(s) 330, in which, prior to reaching the backend service(s) 330, the ingress traffic will be validated by the application gateway agent. The application gateway agent will allow or block the ingress traffic (and/or response to the ingress traffic from the backend service(s) 330) based on whether the parsed data of the ingress traffic (and/or response) matches any one of the predetermined validation requirements. If the ingress traffic (and/or response) passes validation, the ingress traffic (and/or response) will be forwarded to the backend service(s) 330 (and/or the client(s) 310, respectively).

Similarly, the operations gateway agent may be designed, programmed, or otherwise configured to validate operations traffic from the client(s) 310, who may be employees, and further designed, programmed, or otherwise configured to parse employee identities and attributes from the ingress traffic and/or response to apply privacy preserving techniques on any protected information. For example, in an embodiment, the operations gateway may be configured to determine whether an employee is a restricted employee or an unrestricted employee and proceed with validation differently. In an embodiment, the operations gateway agent may be designed, programmed, or otherwise configured to identify an employee based on his/her base and current location, e.g., HRIS data, IP address, etc. For restricted employee access, the operations gateway agent may be configured such that the employee is not be able to access any protected information, in which the operations gateway agent gets data de-identification actions (such as, redaction, masking, bucketing, etc.) according to the data access rights and sharing policies in the predetermined validation requirements, e.g., requests having path, params, header, bookies, body and/or response headers and/or body, e.g., data labels and data access polices for the API being accessed. For unrestricted employee access, the operations gateway agent may be configured to perform audit and traffic capture of the API and any embedded data.

In some embodiments, the predetermined validation requirements may be stored directly on the gateway agent 340, e.g., stored in memory, or may be accessible from a data registry service (DRS) 345 that is in communication with the gateway agent 340. The DRS 345 may be designed, programmed, or otherwise configured to store the predetermined validation requirements from an application developer, e.g., for the online platform and/or backend service(s) 330, for the validation of the ingress traffic and response to the ingress traffic between the client(s) 310 and the backend service(s) 330. In an embodiment, the predetermined validation requirements may be schema information for the ingress traffic and response to the ingress traffic, e.g., data type, data description, labelling, and traffic patterns, that is registered and stored on the DRS 345 by the owner/operator of the online platform or application developer, e.g., via API or data exchange platform (registration platform), that includes, but not limited to, data tags associated with each application and/or backend service(s); request schemas that include, but not limited to, headers, query parameters, cookie schema, and a body; response schema that include, but not limited to, headers and body schema; lookup algorithms; key-value pairs that include a set of associated values and a group of key identifiers; pattern of the key; exemption tag(s); primitive or composite schema; structure of the data, e.g., HTTP, JSON, Protocol Buffers, open-source data query and manipulation language for APIs, Websocket API, or the like; nested messages and schema thereof; public or hidden data; or the like. In some embodiments, the predetermined validation requirements may be case-sensitive. For example, in an embodiment, the predetermined validation requirements may be for a structure with respect to the HTTP Protocol, in which the request schema may include headers, e.g., "get-svc," "x-tt-logid," "x-notice," "x-block," or the like, query parameters, e.g., "aid," "app_name," or the like, and a body and the response scheme includes headers, e.g., "x-email," "x-notice-version," or the like, and a body schema, e.g., type, title, and properties. The schema structure itself may be an object and can have "req" and "resp" schema as properties. In some embodiments, the predetermined validation requirements for the HTTP protocol may include cookies to allow the retention of information about user sessions, in which the cookies may be key-value pairs that are transmitted via cookie headers, e.g., name-value pair, expires or max age, domain, path, secure, HttpOnly, or the like. As such, the gateway agent 340 may be designed, programmed, or otherwise configured to examine the keys present in the cookie headers, e.g., "Set-Cookie", from the response. In other embodiments, the predetermined validation requirements may be for a structure for JSON-based REST API, in which the gateway agent 340 is configured to traverse every field and apply a typed validator for inspection based on the field type, e.g., an object with "name," "email," "uid," "address," "exemption_fields," "audience," "user," or the like, as allowed keys, in which any keys other than the identified keys are not allowed in the object. In other embodiments, the predetermined validation requirements may include structures for other protocols and/or APIs, e.g., Protocol Buffers-based REST API, GraphQL Static Resources, Websocket API, or the like. That is, prior to allowing access or denial of ingress traffic and/or response to the ingress traffic to/from the backend service(s) 330 of the online platform, the application owner or operator, e.g., of the online platform, may register the acceptable validation requirements for validation of the ingress traffic, e.g., the parsed data in the ingress traffic and/or response thereto. In some embodiments, as an added layer of data security and privacy protection, the predetermined validation requirements may be further reviewed by a security team, e.g., the trusted third party or government entity, before implementation of the validation by the gateway agent 340.

As such, when the DRS 345 is included in the Layer Two service layer 360, the gateway agent 340 may be designed, programmed, or otherwise configured to call the schema retrieval from the DRS 345 for the ingress traffic and/or response to the ingress traffic for the application and/or backend service(s) 330 for the validation thereof. In some embodiments, the gateway agent 340 may be configured to inspect whether every key or field in the parsed data, e.g., in the request and/or response, is registered as the predetermined validation requirements, but does not inspect the values themselves, e.g., only views the schema and format. In some embodiments, the gateway agent 340 may be configured to rely on traffic sampling and anomaly detection to inspect the ingress traffic and response to the ingress traffic.

The Layer One proxy server 370 may be a proxy and/or a load balancer that is configured to receive the online traffic from the client(s) 310 from the proxy server 320 of the security gateway that is marked as valid traffic and distribute the validated network or application traffic, e.g., ingress traffic and response to the ingress traffic, to the backend service(s) 330, and from the backend service(s) 330 to the Layer Two proxy server 320, e.g., forward and reverse proxy. The proxy server 370 may also be configured to translate the domain and path of the request from the client(s) 310 by finding the corresponding internet protocol (IP) via a routing database.

The backend service(s) 330 may operate behind the proxy server 370 and may be identified on the server, e.g., 150 of FIG. 1, and/or data center by the IP address and/or service name and cluster name translated from the request from the client(s) 310, e.g., via routing database. In some embodiments, the proxy server 370 may be configured to translate the ingress traffic, e.g., request in the ingress traffic of the uniform resource locator (URL), into a corresponding backend service(s) 330 locator, which may include the service name, cluster name, environment name, and/or region. In some embodiments, the request may include tokens representing the service name, cluster name, environment name, and/or region. Each token may be separated to provide identification of the respected tokens, such that the backend service(s) 330 may be identified or pinpointed, and the proxy server 370 may be configured to retrieve the IP endpoints (e.g., IP address and ports) from the routing database. The proxy server 370 may then be configured to direct the request in the ingress traffic to the identified IP endpoints, e.g., a URL-to-backend locator mapping. The backend service(s) 330 may then be configured to send a response to the ingress traffic, e.g., corresponding to the request from the client(s) 310 for accessing, downloading, uploading, querying/searching, authorizing, managing, integrating with other applications, analyzing usage, running business logic, messaging/chat functions, and/or viewing data from the online platform, which may be validated by the gateway agent 340, as discussed above, before being forwarded back to the client(s) 310.

It is to be understood that the predetermined validation requirements may be determined based on compliance or assurance requirements for the ingress traffic. The security gateway may be configured to provide a centralized place to (1) gather or intercept all the ingress traffic from the client(s) 310 to the backend service(s) 330 of the online platform (including the responses from the backend service(s) 330), (2) parse the data or payload and interpret the data or payload within the request and/or the response in the ingress data, and (3) apply the privacy protection or assurance policies (e.g., based on the predetermined validation requirements) to or on top of the ingress traffic to validate the data or payload carried within the request and/response in the ingress data.

It is to be understood that features described in the embodiments disclosed herein provide for a security gateway that serves as an ingress gateway and is responsible for inspecting ingress traffic in an assured Internet data center environment (i.e., the neutral or trusted environment). In an example embodiment, the security gateway includes the gateway agent 340 and proxy server 320 that are deployed in two separate containers within a pod on a system (e.g., an open-source system for automating deployment, scaling, and management of containerized applications, etc.). Ingress traffic (e.g., the request from the client device 310, etc.) may be forwarded to the gateway agent 340 (e.g., by the proxy server 320) before the request is passed through to the proxy server 370 (of the online platform). If the ingress traffic is determined to be valid traffic by the gateway agent 340, the request is forwarded onto the backend service(s) 330 for the online platform or is otherwise blocked.

Figure 4:
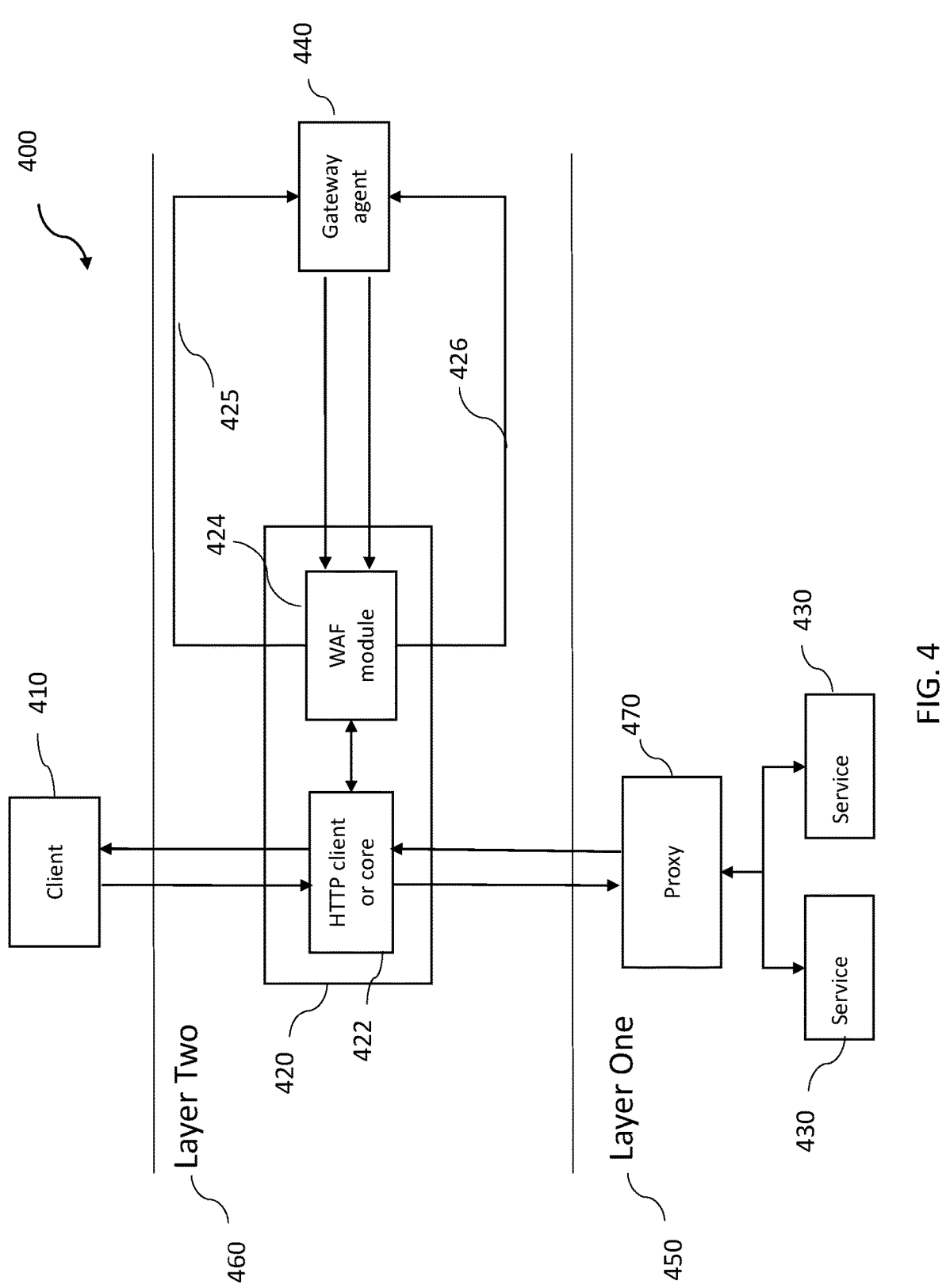
FIG. 4 is a schematic view of another example ingress traffic validation system, arranged in accordance with at least some embodiments described herein.

FIG. 4 illustrates another example embodiment of an ingress traffic validation system 400, which may have the same or similar features as the system architecture 200 of FIG. 2 or the ingress traffic validation system 300 of FIG. 3.

The ingress traffic validation system 400 may include a two-layer architecture for accessing the backend service(s) 430 for the online platform, in which the ingress traffic validation system 400 has the necessary security and privacy protection of protected information, e.g., of the client or the system. The two-layer architecture may include a first layer (Layer One 450) and a second layer (Layer Two 460), which may be a security gateway. In some embodiments, the first layer 450 may be owned and/or operated by the owner/operator of the online platform, e.g., including the backend service(s). In some embodiments, the second layer 460 maybe owned and/or operated by a third-party provider, e.g., a trusted third-party in a neutral or trusted environment that is independently operated and/or separately controlled from the owner/operator of the online platform.

The ingress traffic validation system 400 may include a client(s) 410, the Layer Two 460 service which may be the security gateway (referenced herein as "security gateway") that may include proxy server 420 and gateway agent 440, and the Layer One service layer 450 that may include proxy server 470 and backend service(s) 430 for the online platform. While the embodiment illustrated in FIG. 4, is an illustrated example using the HTTP API, such disclosure is not intended to be limiting. Rather, the ingress traffic validation system 400 may be used for different schema and/or traffic formats, including, but not limited to, based on HTTP API, JSON API, JSON-Based Representational State Transfer (REST) API, Protocol Buffer-based REST API, open-source data query and manipulation language for APIs, Websocket API, or the like.

The client(s) 410 may be a user(s) of a terminal device, e.g., 110, 120, 130, 140 of FIG. 1 and/or client 210 of FIG. 2 and/or client(s) 310 of FIG. 3, in which an application or API, web-accessing program, or other Internet enabled program (web or mobile) may be used for accessing the server, e.g., 150, which hosts and/or stores the backend service(s) 430, e.g., for the online platform, for example, at a datacenter. The client(s) 410 may send a request to the online platform, e.g., to the backend service(s) 430, for accessing, downloading, uploading, querying/searching, authorizing, managing, pushing notifications, integrating with other applications, analyzing usage, running business logic, messaging/chat functions, and/or viewing data from the online platform.

The proxy server 420 of the security gateway may be a proxy (and/or reverse proxy), gateway, and/or a load balancer that is designed, programmed, or otherwise configured to receive the ingress traffic, e.g., including a request, payload in the request, or other data, from the client(s) 410 and distribute and/or forward the ingress traffic from the client(s) 410 to the Layer One services, e.g., the Layer One proxy server 470 and the backend service(s) 430, and from the backend service(s) 430 to the client(s) 410, e.g., a response to the ingress traffic. The proxy server 420 may also be configured to redirect the ingress traffic (and/or response thereto) to the gateway agent 440 and receive the ingress traffic (and/or response thereto) and/or a result of the validation (as discussed further below). In some embodiments, the proxy server 420 may be configured to translate the domain and path of the request from the client(s) 410 by finding the corresponding internet protocol (IP) via a routing database. In some embodiments, transport layer security may be used to access the routing database, e.g., cryptographic protocol that provides security of data sent between the client(s) 410 and the routing database. In some embodiments, the proxy server 420 may be configured to block the ingress traffic when marked/labeled as being invalid traffic.

In some embodiments, the proxy server 420 may include an HTTP client or core 422 for storing HTTP cache, e.g., cluster IP information/translation, and a HTTP web application firewall (WAF) module 424 for filtering, monitoring, and blocking HTTP traffic. As such, the proxy server 420 may be configured to translate the domain and path of the request from the client(s) 410 by finding the corresponding internet protocol (IP) via the HTTP client or core 422.

The HTTP client or core 422 may be designed, programmed, or otherwise configured to receive the ingress traffic, e.g., request, from the client(s) 410; send the request from the client(s) 410 to the backend service(s) 430, e.g., via the Layer One proxy server 470; receive the response to the request from the backend service(s) 430; and/or forward the response to the client(s) 410. In some embodiments, during the request and response forwarding, the ingress traffic may be validated, e.g., via a gateway agent 440. In some embodiments, the HTTP client or core 422 may be configured to send, receive, and/or translate the HTTP requests, e.g., to translate the domain and path of the request from the client(s) 410 by finding the corresponding internet protocol (IP).

The WAF module 424 may be designed, programmed, or otherwise configured to securely receive and/or forward the ingress traffic and/or response to the ingress traffic from the HTTP client or core 422. The WAF module 424 is further configured to securely communicate with the gateway agent 440 to receive the validation of the request and/or response, e.g., using security/privacy channels and/or encryption techniques. In some embodiments, the WAF module 424 may be designed, programmed, or otherwise configured to filter, monitor, and block HTTP traffic.

The gateway agent 440 of the security gateway may be designed, programmed, or otherwise configured to be in secure communication with the proxy server 420, e.g., the WAF module 424, and receive all online traffic (such as ingress traffic), e.g., including requests and/or responses, to/from the clients connected to the online platform, parse the online traffic, e.g., every data field and/or identify any key-value pairs, based on the format of the online traffic, such as Hypertext Transfer Protocol (HTTP) format, JavaScript Object Notation (JSON) format, Extensible Markup Language (XML) format, etc., and apply assurance checks on the online traffic, e.g., validation.

In an embodiment, the gateway agent 440 may be configured to validate the parsed data of the ingress traffic and/or the response to the ingress traffic from the online platform, e.g., the backend service(s) 430, based on predetermined validation requirements, e.g., to allow or block the transmission of the same. For example, if a request (and/or its response) in the ingress traffic matches one of the predetermined validation requirements (that is, the schema of the request and/or its response is registered with the gateway agent 440), the gateway agent 440 may validate or mark/label the ingress traffic as valid traffic. If a request (and/or its response) in the ingress traffic does not match any one of the predetermined validation requirements (that is, the request and/or its response is not registered with the gateway agent 440), the gateway agent 440 may invalidate or mark/label the ingress traffic as invalid traffic. In some embodiments, the gateway agent 440 may be designed, programmed, or otherwise configured to store inspection logs, and return the result of the validation, e.g., pass or block, and/or the ingress traffic to the proxy server 420. In some embodiments, in which the online traffic, e.g., ingress traffic, includes the request and response exchanged between the client(s) 410 and the backend service(s) 430, in which both the request and the response undergo inspection, the gateway agent 440 may be configured to temporarily store the request from the client(s) 410, e.g., as metadata, until the backend response from the backend service(s) 430 is received, e.g., for coordination of the request and response, for example, until the response to the request is received. The gateway agent 440 may also be designed, programmed, or otherwise configured to implement assurance audit logging and sampling for offline traffic analysis to ensure data security and privacy protection.

In some embodiments, the predetermined validation requirements may be stored directly on the gateway agent 440, e.g., stored in memory, or may be accessible from a data registry service (DRS) that is in communication with the gateway agent 440. The DRS may be designed, programmed, or otherwise configured to store the predetermined validation requirements from an application developer, e.g., for the online platform and/or backend service(s) 430, for the validation of the ingress traffic and response to the ingress traffic between the client(s) 410 and the backend service(s) 430. In an embodiment, the predetermined validation requirements may be schema information for the ingress traffic and response to the ingress traffic, e.g., data type, data description, labelling, and traffic patterns, that is registered and stored on the DRS by the owner/operator of the online platform or application developer, e.g., via API or data exchange platform (registration platform), that includes, but not limited to, data tags associated with each application and/or backend service(s); request schemas that include, but not limited to, headers, query parameters, cookie schema, and a body; response schema that include, but not limited to, headers and body schema; lookup algorithms; key-value pairs that include a set of associated values and a group of key identifiers; pattern of the key; exemption tag(s); primitive or composite schema; structure of the data, e.g., HTTP, JSON, Protocol Buffers, open-source data query and manipulation language for APIs, Websocket API, or the like; nested messages and schema thereof; public or hidden data; or the like. In some embodiments, the predetermined validation requirements may be case-sensitive. That is, prior to allowing access or denial of ingress traffic and/or response to the ingress traffic to/from the backend service(s) 430 of the online platform, the application owner or operator, e.g., of the online platform, may register the acceptable validation requirements for validation of the ingress traffic, e.g., the parsed data in the ingress traffic and/or response thereto. In some embodiments, as an added layer of data security and privacy protection, the predetermined validation requirements may be further reviewed by a security team, e.g., the trusted third party or government entity, before implementation of the validation by the gateway agent 440.

As such, when the DRS is included in the Layer Two service layer/security gateway 460, the gateway agent 440 may be designed, programmed, or otherwise configured to call the schema retrieval from the DRS for the ingress traffic and/or response to the ingress traffic for the application and/or backend service(s) 430 for the validation thereof. In some embodiments, the gateway agent 440 may be configured to inspect whether every key or field in the parsed data, e.g., in the request and/or response, is registered as the predetermined validation requirements, but does not inspect the values themselves, e.g., only views the schema and format. In some embodiments, the gateway agent 440 may be configured to rely on traffic sampling and anomaly detection to inspect the ingress traffic and response to the ingress traffic.

As schematically shown in FIG. 4, in an example embodiment, the security gateway may include the gateway agent 440 and proxy server 420 as a standalone process that are bundled within a single container image within a pod of a system (e.g., an open-source system for automating deployment, scaling, and management of containerized applications, etc.). The gateway agent 440 may be in a sidecar pattern communication with the proxy server 420, e.g., the WAF module 424, over a transmission control protocol (TCP) network, e.g., a secure channel. When validating the ingress traffic, the gateway agent 440 may be configured to receive the ingress traffic, e.g., including the request, from the WAF module 424 and return the request validation result, e.g., validation of the ingress traffic or mark/label of the ingress traffic as valid traffic or invalid traffic, as depicted as process 425. When validating the ingress traffic, the gateway agent 440 may call for a schema retrieval from memory or the DRS as a validation request for the registered schema information for the ingress traffic to validate the ingress traffic and/or parsed data thereof. After the gateway agent 440 validates the ingress traffic, the gateway agent 440 may be configured to forward the ingress traffic as valid traffic to the WAF module 424, and the WAF module 424 may be designed, programmed, or otherwise configured to forward the ingress traffic to the HTTP client or core 422 or if marked/labeled as invalid traffic, blocking the same.

Similarly, when validating the response to the ingress traffic, e.g., from the backend service(s) 430, the gateway agent 440 may be configured to receive the response to the ingress traffic, e.g., response, from the WAF module 424 and return the request validation result, e.g., validation of the response to the ingress traffic or mark/label of the ingress traffic as valid traffic or invalid traffic, as depicted as process 426. When validating the response to the ingress traffic, the gateway agent 440 may call for a schema retrieval from memory or the DRS as a validation request for the registered schema information for the response to the ingress traffic to validate the response to the ingress traffic and/or parsed data thereof. After the gateway agent 440 validates the response to the ingress traffic, the gateway agent 440 may be configured to forward the ingress traffic as valid traffic to the WAF module 424, and the WAF module 424 may be designed, programmed, or otherwise configured to forward the ingress traffic to the HTTP client or core 422 (and to the client(s) 410 making the request) or if marked/labeled as invalid traffic, blocking the same.

The Layer One proxy server 470 may be a proxy and/or a load balancer that is configured to receive the online traffic from the client(s) 410 from the proxy server 420 of the security gateway that is marked as valid traffic and distribute the validated network or application traffic, e.g., ingress traffic, to the backend service(s) 430, and from the backend service(s) 430 to the proxy server 420 of the security gateway as a response to the ingress traffic, e.g., forward and reverse proxy. The proxy server 470 may also be configured to translate the domain and path of the request from the client(s) 410 by finding the corresponding internet protocol (IP) via a routing database.

The backend service(s) 430 may operate behind the proxy server 470 and may be identified on the server, e.g., 150 of FIG. 1, and/or data center by the IP address and/or service name and cluster name translated from the request from the client(s) 410, e.g., via routing database. In some embodiments, the proxy server 470 may be configured to translate the ingress traffic, e.g., request in the ingress traffic of the uniform resource locator (URL), into a corresponding backend service(s) 430 locator, which may include the service name, cluster name, environment name, and/or region. In some embodiments, the request may include tokens representing the service name, cluster name, environment name, and/or region. Each token may be separated to provide identification of the respected tokens, such that the backend service(s) 430 may be identified or pinpointed, and the proxy server 470 may be configured to retrieve the IP endpoints (e.g., IP address and ports) from the routing database. The proxy server 470 may then be configured to direct the request in the ingress traffic to the identified IP endpoints, e.g., a URL-to-backend locator mapping. The backend service(s) 430 may then be configured to send a response to the ingress traffic, e.g., corresponding to the request from the client(s) 410 for accessing, downloading, uploading, querying/searching, authorizing, managing, integrating with other applications, analyzing usage, running business logic, messaging/chat functions, and/or viewing data from the online platform, which may be validated by the gateway agent 440, as discussed above, before being forwarded back to the client(s) 410.

It is to be understood that the predetermined validation requirements may be determined based on compliance or assurance requirements for the ingress traffic. The security gateway may be configured to provide a centralized place to (1) gather or intercept all the ingress traffic from the client(s) 410 to the backend service(s) 430 of the online platform (including the responses from the backend service(s) 430), (2) parse the data or payload and interpret the data or payload within the request and/or the response in the ingress data, and (3) apply the privacy protection or assurance policies (e.g., based on the predetermined validation requirements) to or on top of the ingress traffic to validate the data or payload carried within the request and/response in the ingress data.

It is to be understood that features described in the embodiments disclosed herein provide for a security gateway that serves as an ingress gateway and is responsible for inspecting ingress traffic and/or responses thereto in an assured Internet data center environment (i.e., the neutral or trusted environment). In an embodiment, the security gateway includes the gateway agent 440 and proxy server 420 that are deployed in a single container or as two separate containers within a pod on a system (e.g., an open-source system for automating deployment, scaling, and management of containerized applications, etc.). Ingress traffic (e.g., the request from the client(s) 410, etc.) may be forwarded to the gateway agent 440 (e.g., by the proxy server 420) before the request is passed through to the proxy server 470 (of the online platform). If the ingress traffic is determined to be valid traffic by the gateway agent 440, the request is forwarded onto the backend service(s) 430 for the online platform or is otherwise blocked, e.g., by the gateway agent 440 and/or proxy server 420.

For example, in an embodiment, the client(s) 410 may send a message in a live stream room hosted by the online platform, in which the message may be sent from the client(s) 410 to the backend service(s) 430 via an API. Before the message reaches the backend service(s) 430, the ingress traffic will be validated by the security gateway (e.g., service layer 460), e.g., by the gateway agent 440 via schema validation. If and only if the ingress traffic matches with corresponding schema, e.g., stored in the DRS based on data registered by the application developer or owner (field-level matching), the ingress traffic may be allowed to pass down to the backend service(s) 430. Once the backend service(s) 430 receive the message, the backend service(s) 430 may propagate the message to all of the clients connected on the same live stream room. The backend service(s) 430 may send a response back to the client using another API, in which the response will be validated by the gateway agent 440, e.g., schema validation. As such, once a TCP connection is made between the client(s) 410 and the backend service(s) 430 via validation by the gateway agent 440, a websocket computer communications protocol (e.g., extension to HTTP/1) may be established (e.g., on application layer L7) that provides full-duplex communication channels over the TCP connection. That is, once the connection is established, websocket may use a binary-based protocol with two types of frames: control frames and data frames. The control frames are used for connection management, such as opening and closing the connection, while data frames are used for exchanging actual data between the client and backend service(s), e.g., on the server. The frame format includes a header and a payload, with the header specifying the frame type, length, and other control parameters. As such, the client(s) 410 and the backend service(s) 430 may have bidirectional communication availabilities for communicating, e.g., for messaging, sending push notifications, or the like. If the ingress traffic and/or the response to the ingress traffic fails validation, the traffic may be directly blocked and may not reach the client(s) 410 and/or the backend service(s) 430.

Figure 5:
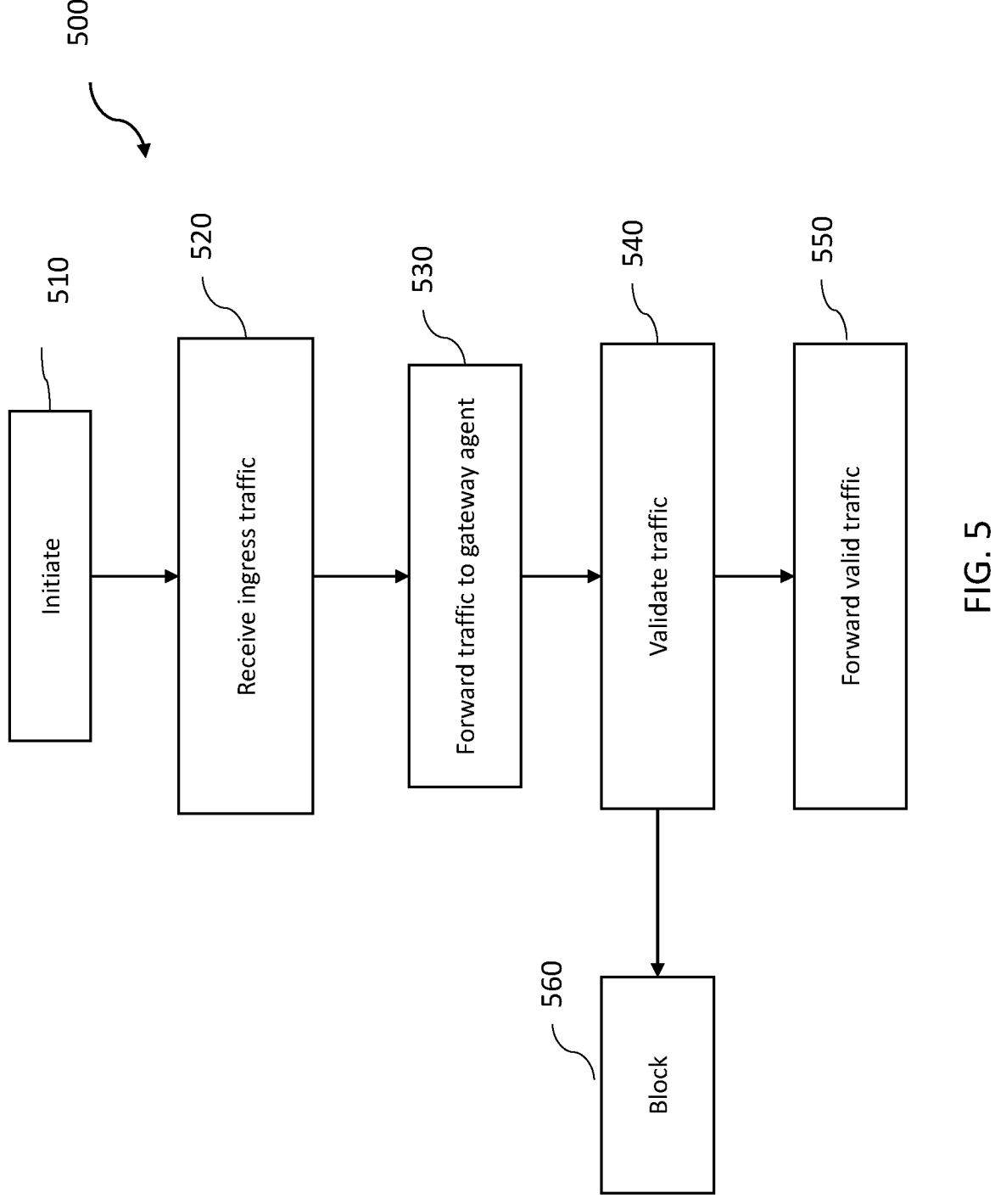
FIG. 5 is a flow chart illustrating an example processing flow of validating ingress traffic in a computer network system, in accordance with at least some embodiments described herein.

FIG. 5 is a flow chart illustrating an example processing flow 500 of validating ingress traffic in a computer network system, in accordance with at least some embodiments described herein.

Figure 6:
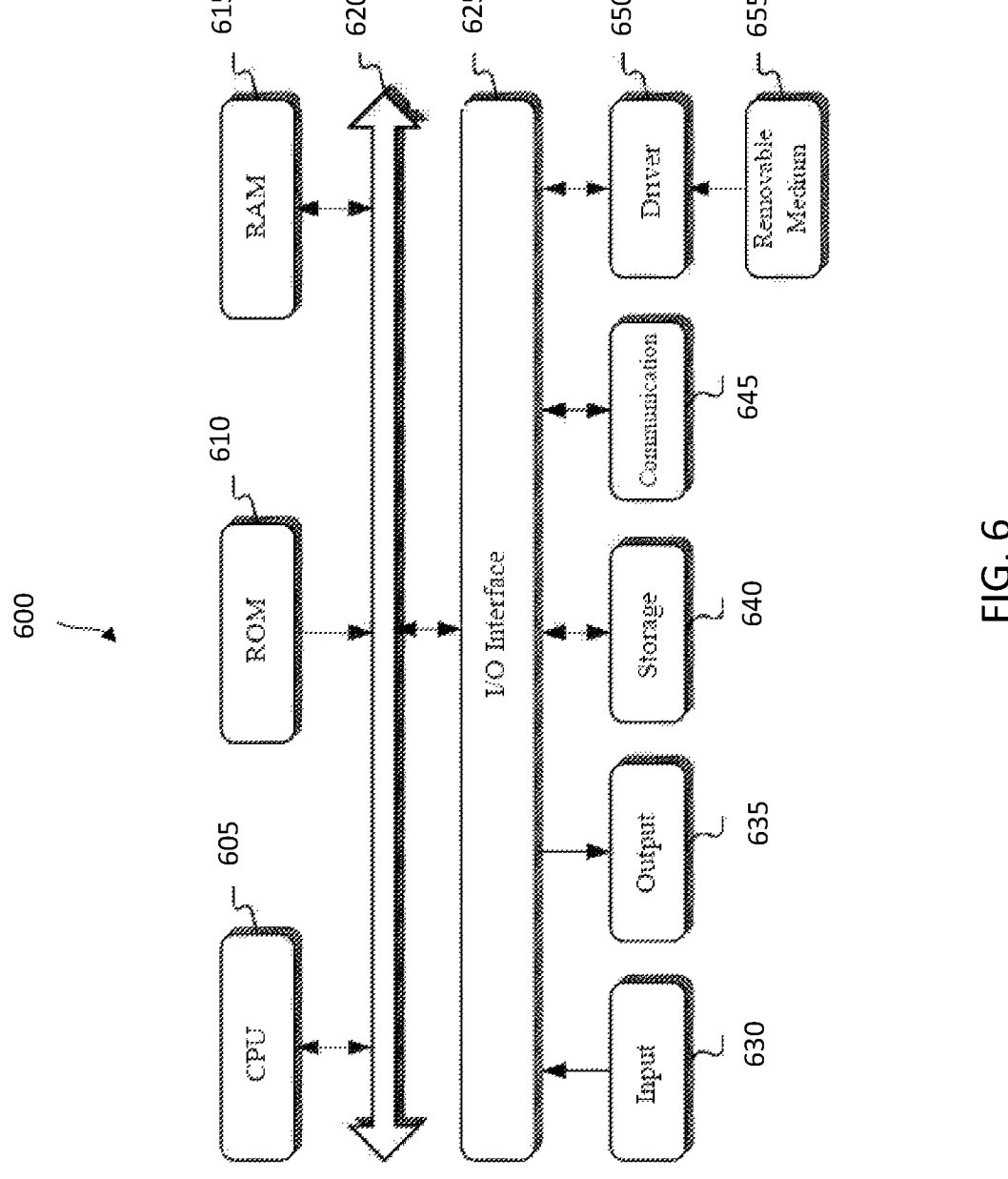
FIG. 6 is a schematic structural diagram of an example computer system applicable to implementing a device, arranged in accordance with at least some embodiments described herein.

It is to be understood that the processing flow 500 disclosed herein can be conducted by one or more processors such as a local device management CPU of the device including e.g., the processor of the gateway, the one or more of the device 110, 120, 130, 140, 150 of FIG. 1, the CPU 605 of FIG. 6, and/or any other suitable processor, unless otherwise specified.

It is also to be understood that the processing flow 500 can include one or more operations, actions, or functions as illustrated by one or more of blocks 510, 520, 530, 540, 550, and 560. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized. It is to be understood that the processes, operations, or actions described in FIGS. 2, 3, and 4 may be implemented or performed by the processor. Processing flow 500 may begin at block 510.

At block 510 (Initiate), the processor may perform initializations for the security gateway. In an example embodiment, the processor may provide a memory space for the security gateway to store the predetermined validation requirements for traffic validation. An owner or operator of the application or online platform may store predetermined validation requirements in or register the predetermined validation requirements with the security gateway, e.g., via a registration platform. The predetermined validation requirements may include schema information for all the requests and/or their corresponding responses that have been predetermined or predefined as satisfying the data security and privacy policy, the corresponding proxy account header information, etc. In an embodiment, the predetermined validation requirements may be schema information for the ingress traffic and response to the ingress traffic, e.g., data type, data description, labelling, and traffic patterns, that is registered and stored on the DRS by the owner/operator of the online platform or application developer, e.g., via API or data exchange platform (registration platform), that includes, but not limited to, data tags associated with each application and/or backend service(s); request schemas that include, but not limited to, headers, query parameters, cookie schema, and a body; response schema that include, but not limited to, headers and body schema; lookup algorithms; key-value pairs that include a set of associated values and a group of key identifiers; pattern of the key; exemption tag(s); primitive or composite schema; structure of the data, e.g., HTTP, JSON, Protocol Buffers, open-source data query and manipulation language for APIs, Websocket API, or the like; nested messages and schema thereof; public or hidden data; or the like. Processing may proceed from block 510 to block 520.

At block 520 (Receive Ingress Traffic), the processor may receive or obtain ingress traffic (e.g., from the client 210, 310, or 410), or a response to the ingress traffic from the backend service(s) (e.g., 230, 330, 430) at a proxy server (e.g., 220, 320, 420). The client may send a request to the online platform, e.g., to the backend service(s), for accessing, downloading, uploading, querying/searching, authorizing, managing, pushing notifications, integrating with other applications, analyzing usage, running business logic, messaging/chat functions, and/or viewing data from the online platform. Processing may proceed from block 520 to block 530.

At block 530 (Forward Traffic to Gateway Agent), the processor may forward the ingress traffic and/or the response to the ingress traffic (payload or the request of the payload) to the gateway agent (e.g., 340, 440), e.g., via the proxy server. Processing may proceed from block 530 to block 540.

At block 540 (Validate Traffic), the processor may be configured to receive or obtain, e.g., via the gateway agent, the ingress traffic from the proxy server, and validate the ingress traffic (and/or response thereto) based on the predetermined rules in block 510. When the ingress traffic (and/or response thereto) matches one or more of the predetermined validation requirements (e.g., the schema of the request and/or response of the ingress traffic exists in or is registered with the security gateway), the processor may determine and/or mark the ingress traffic (and/or response thereto) as valid traffic. When the ingress traffic does not match any of the predetermined validation requirements (e.g., the schema of the request and/or response of the ingress traffic does not exist in or is not registered with the security gateway), the processor may determine and/or mark the ingress traffic (and/or response thereto) as invalid traffic. It is to be understood that the processor may also (1) parse, interpret, and determine the type of the request (or response), and (2) perform endpoint, account, and/or schema validation on the ingress traffic based on its type. If the endpoint, account, and/or schema validation passes based on the predetermined validation requirements (e.g., the fields of the endpoint, account, and/or schema validation match one or more of the predetermined validation requirements), the processor may determine and/or mark the ingress traffic as valid traffic. If the endpoint, account, and/or schema validation does not pass based on the predetermined validation requirements, the processor may determine and/or mark the ingress traffic as invalid traffic. Processing may proceed from block 540 to block 550 or 560.

At block 550 or 560 (Forward Valid Traffic or Block), the processor may receive or obtain the valid or invalid traffic from the gateway agent. The processor may also (1) forward the valid traffic to the backend service(s) (e.g., of the online platform) at 550, or (2) block the invalid traffic from being sent to the backend service(s) at 560. In some embodiments, the processor may also (1) forward the valid response to the ingress traffic back to the client at 550 or (2) block the invalid response to the ingress traffic at 560.

It is to be understood that processor may also perform the steps or methods described in FIGS. 2, 3, and 4. Features in the embodiments disclosed herein may also provide traffic interception and validation on different types of application layer (L7) network protocols.

FIG. 6 is a schematic structural diagram of an example computer system 600 applicable to implementing an electronic device (for example, the gateway, the server or one of the terminal devices shown in FIG. 1, etc.), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts and/or the processes described in other figures may be implemented as computer software programs or in hardware. The computer program product may include a computer program stored in a computer readable non-volatile medium. The computer program includes program codes for performing the method shown in the flowcharts.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A security gateway for validating ingress traffic in a computer network system, the security gateway comprising: a proxy server; and a gateway agent, wherein the proxy server is configured to receive the ingress traffic and to forward the ingress traffic to the gateway agent, the gateway agent is configured to validate the ingress traffic as valid ingress traffic or invalid ingress traffic based on predetermined validation requirements, and the proxy server is further configured to receive the valid ingress traffic from the gateway agent and forward the valid ingress traffic to a backend service or block the invalid ingress traffic.

Aspect 2. The security gateway of Aspect 1, wherein the ingress traffic includes a request from a client device, and wherein the backend service is configured to send a response to the ingress traffic and the gateway agent is further configured to validate the response to the ingress traffic as being a valid response to the ingress traffic or invalid response to the ingress traffic based on the predetermined validation requirements.

Aspect 3. The security gateway of Aspect 2, wherein the gateway agent is configured to temporarily store the request from the client device until the response to the ingress traffic is received.

Aspect 4. The security gateway of Aspects 2 or 3, wherein the proxy server includes an HTTP client and an HTTP web application firewall (WAF) module, the HTTP client is configured to send and/or receive HTTP requests, and the WAF module is configured to securely send the request from the client device to the gateway agent and receive a result of the validation of the request from the client device.

Aspect 5. The security gateway of any of Aspects 1-4, wherein the predetermined validation requirements include a request schema that includes one or more of headers, query parameters, and a body, and a response schema that includes one or more of headers and a body schema.

Aspect 6. The security gateway of any of Aspects 1-5, wherein the predetermined validation requirements include key-value pairs.

Aspect 7. The security gateway of any of Aspects 1-6, wherein the proxy server is configured to translate a request of a uniform resource locator (URL) in the ingress traffic into a corresponding backend locator including one or more of a service name, a cluster name, an environment name, and a region.

Aspect 8. The security gateway of any of Aspects 1-7, wherein the gateway agent is configured to communicate with the proxy server over a transmission control protocol (TCP) network.

Aspect 9. The security gateway of any of Aspects 2-8, wherein the valid ingress traffic and the valid response to the ingress traffic are used to form a websocket computer communications protocol between the client device and the backend service.

Aspect 10. A security gateway for validating a response to ingress traffic in a computer network system, the security gateway comprising: a proxy server; and a gateway agent, wherein the proxy server is configured to receive the response to the ingress traffic from a backend service as a response to a request in the ingress traffic from a client device and to forward the response to the ingress traffic to the gateway agent, the gateway agent is configured to validate the response to the ingress traffic as a valid response to the ingress traffic or invalid response to the ingress traffic based on predetermined validation requirements, and the proxy server is further configured to receive the valid response to the ingress traffic from the gateway agent and forward the valid response to the ingress traffic to the client device or block the invalid response to the ingress traffic.

Aspect 11. The security gateway of Aspect 10, wherein the proxy server includes an HTTP client and an HTTP web application firewall (WAF) module, the HTTP client being configured to send and/or receive HTTP requests, and the WAF module is configured to securely send the response to the ingress traffic from the backend service to the gateway agent and receive a result of the validation of the response to the ingress traffic.

Aspect 12. The security gateway of any of Aspects 10-11, wherein the predetermined validation requirements include a response schema that includes one or more of headers and a body schema.

Aspect 13. The security gateway of any of Aspects 10-12, wherein the predetermined validation requirements include key-value pairs.

Aspect 14. The security gateway of any of Aspects 10-13, wherein the proxy server is configured to translate a request of a uniform resource locator (URL) in the ingress traffic into a corresponding backend locator that includes one or more of a service name, a cluster name, an environment name, and a region.

Aspect 15. The security gateway of any of Aspects 10-14, wherein the gateway agent is configured to communicate with the proxy server over a transmission control protocol (TCP) network.

Aspect 16. An ingress traffic validation system for a computer network system, the ingress traffic validation system comprising: a security gateway including a proxy server and a gateway agent; and a load balancer for forwarding the ingress traffic to one or more backend service(s), wherein the proxy server is configured to receive the ingress traffic from a client device and to forward the ingress traffic to the gateway agent, the gateway agent is configured to validate the ingress traffic as valid ingress traffic or invalid ingress traffic based on predetermined validation requirements, and the proxy server is further configured to receive the valid ingress traffic from the gateway agent and forward the valid ingress traffic to the load balancer or block the invalid ingress traffic.

Aspect 17. The ingress traffic validation system of Aspect 16, wherein the ingress traffic includes a request from a client device, and wherein the one or more backend services are configured to send a response to the ingress traffic and the gateway agent is further configured to validate the response to the ingress traffic as being a valid response to the ingress traffic or invalid response to the ingress traffic based on the predetermined validation requirements.

Aspect 18. The ingress traffic validation system of Aspect 17, wherein the gateway agent is configured to temporarily store the request from the client device until the response to the ingress traffic is received.

Aspect 19. The ingress traffic validation system of any of Aspects 16-18, wherein the proxy server includes an HTTP client and an HTTP web application firewall (WAF) module, the HTTP client is configured to send and/or receive HTTP requests, and the WAF module is configured to securely send the request from the client device to the gateway agent and receive a result of the validation of the request from the client device.

Aspect 20. The ingress traffic validation system of any of Aspects 16-19, wherein the predetermined validation requirements include a request schema that includes one or more of headers, query parameters, and a body, and a response schema that includes one or more of headers and a body schema.

Aspect 21. The ingress traffic validation system of any of Aspects 16-20, wherein the predetermined validation requirements include key-value pairs.

Aspect 22. A method for validating ingress traffic in a computer network system, the method comprising: receiving, by a proxy server, the ingress traffic from a client device; forwarding, by the proxy server, the ingress traffic to a gateway agent; validating, by the gateway agent, the ingress traffic as valid ingress traffic or invalid ingress traffic based on predetermined validation requirements; receiving, by the proxy server, the valid ingress traffic or invalid ingress traffic from the gateway agent; and forwarding, by the proxy server, the valid ingress traffic to a backend service or blocking the invalid ingress traffic.

Aspect 23. The method of Aspect 22, wherein the ingress traffic includes a request from the client device, and the backend service is configured to send a response to the request in the ingress traffic, and the method further comprising temporarily storing the request from the client device until the response to the ingress traffic is received.

Aspect 24. The method of any of Aspects 22-23, further comprising translating, by the proxy server, a request uniform resource locator (URL) in the ingress traffic into a corresponding backend locator that includes one or more of a service name, a cluster name, an environment name, and a region.

Aspect 25. The method of any of Aspects 22-24, further comprising establishing a websocket computer communications protocol between the client device and the backend service.

Aspect 26. A non-transitory computer-readable medium having computer-executable instructions stored thereon that, upon execution, cause one or more processors to perform operations comprising: receive, by a proxy server, ingress traffic from a client device and/or a response to the ingress traffic from a backend service; forward, by the proxy server, the ingress traffic and/or the response to the ingress traffic to a gateway agent; validate, by the gateway agent, the ingress traffic and/or the response to the ingress traffic as valid ingress traffic and/or valid response to the ingress traffic or invalid ingress traffic and/or invalid response to the ingress traffic based on predetermined validation requirements; receive, by the proxy server, the valid ingress traffic and/or valid response to the ingress traffic or invalid ingress traffic and/or invalid response to the ingress traffic from the gateway agent; and forward, by the proxy server, the valid ingress traffic to the backend service and/or forward the valid response to the ingress traffic to the client device or block the invalid ingress traffic and/or invalid response to the ingress traffic.

Aspect 27. The non-transitory computer-readable medium of Aspect 26, wherein the ingress traffic includes a request from the client device and wherein the backend service is configured to send a response to the request for the ingress traffic, and the processor is further configured to temporarily store the request from the client device until the response of the ingress traffic is received.

Aspect 28. The non-transitory computer-readable medium of any of Aspects 26-28, wherein the processor is further configured to translate, by the proxy server, a request of a uniform resource locator (URL) in the ingress traffic into a corresponding backend locator composed of one or more of a service name, a cluster name, an environment name, and a region.

Aspect 29. The non-transitory computer-readable medium of any of Aspects 26-28, wherein the processor is further configured to establish a websocket computer communications protocol between the client device and the backend service.

Aspect 30. The non-transitory computer-readable medium of any of Aspects 26-29, wherein the predetermined validation requirements include a request schema that includes one or more of headers, query parameters, and a body, and a response schema that includes one or more of headers and a body schema.

Aspect 31. A security gateway for validating ingress traffic and/or a response to the ingress traffic in a computer network, the security gateway comprising: a proxy server; and a gateway agent, wherein the proxy server is configured to receive the ingress traffic and/or the response to the ingress traffic and to forward the ingress traffic and/or the response to the ingress traffic to the gateway agent, the gateway agent is configured to validate the ingress traffic and/or the response to the ingress traffic as valid ingress traffic and/or valid response to ingress traffic or invalid ingress traffic and/or invalid response to ingress traffic based on predetermined validation requirements, and the proxy server is further configured to receive the valid ingress traffic from the gateway agent and forward the valid ingress traffic to a backend service and/or receive the valid response to the ingress traffic from the gateway agent and forward the valid response to the ingress traffic to a client device or block the invalid ingress traffic and/or invalid response to the ingress traffic.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A security gateway for validating ingress traffic in a computer network system, the security gateway comprising:
   a proxy server; and
   a gateway agent,
   wherein the proxy server is configured to receive the ingress traffic and to forward the ingress traffic to the gateway agent,
   the gateway agent is configured to validate the ingress traffic as valid ingress traffic or invalid ingress traffic based on predetermined validation requirements, the predetermined validation requirements comprise a request schema and a response schema, the request schema comprises one or more of headers, query parameters, or a body, and the response schema comprises one or more of headers or a body; and
   the proxy server is further configured to receive the valid ingress traffic from the gateway agent and forward the valid ingress traffic to a backend service or block the invalid ingress traffic,
   wherein the ingress traffic includes a request from a client device, and wherein the backend service is configured to send a response to the valid ingress traffic, and the gateway agent is further configured to validate the response to the valid ingress traffic as being a valid response to the valid ingress traffic or invalid response to the valid ingress traffic based on the predetermined validation requirements.

2. The security gateway of claim 1, wherein the gateway agent is configured to temporarily store the request from the client device until the response to the valid ingress traffic is received.

3. The security gateway of claim 1, wherein the proxy server includes an HTTP client and an HTTP web application firewall (WAF) module,
   the HTTP client is configured to send and/or receive HTTP requests, and
   the WAF module is configured to securely send the request from the client device to the gateway agent and receive a result of a validation of the request from the client device.

4. The security gateway of claim 1, wherein the predetermined validation requirements include key-value pairs.

5. The security gateway of claim 1, wherein the proxy server is configured to translate a request of a uniform resource locator (URL) in the ingress traffic into a corresponding backend locator including one or more of a service name, a cluster name, an environment name, and a region.

6. The security gateway of claim 1, wherein the gateway agent is configured to communicate with the proxy server over a transmission control protocol (TCP) network.

7. The security gateway of claim 1, wherein the valid ingress traffic and the valid response to the valid ingress traffic are used to form a WebSocket computer communications protocol between the client device and the backend service.

8. An ingress traffic validation system for a computer network system, the ingress traffic validation system comprising:
   a security gateway including a proxy server and a gateway agent; and
   a load balancer for forwarding ingress traffic to one or more backend services, wherein the proxy server is configured to receive the ingress traffic from a client device and to forward the ingress traffic to the gateway agent, the gateway agent is configured to validate the ingress traffic as valid ingress traffic or invalid ingress traffic based on predetermined validation requirements, the predetermined validation requirements comprise a request schema and a response schema, the request schema comprises one or more of headers, query parameters, or a body, and the response schema comprises one or more of headers or a body; and the proxy server is further configured to receive the valid ingress traffic from the gateway agent and forward the valid ingress traffic to the load balancer or block the invalid ingress traffic, wherein the ingress traffic includes a request from the client device, and wherein the one or more backend services are configured to send a response to the valid ingress traffic, and the gateway agent is further configured to validate the response to the valid ingress traffic as being a valid response to the valid ingress traffic or invalid response to the valid ingress traffic based on the predetermined validation requirements.

9. The ingress traffic validation system of claim 8, wherein the gateway agent is configured to temporarily store the request from the client device until the response to the valid ingress traffic is received.

10. The ingress traffic validation system of claim 8, wherein the proxy server includes an HTTP client and an HTTP web application firewall (WAF) module, the HTTP client is configured to send and/or receive HTTP requests, and the WAF module is configured to securely send the request from the client device to the gateway agent and receive a result of a validation of the request from the client device.

11. The ingress traffic validation system of claim 8, wherein the predetermined validation requirements include key-value pairs.

12. A non-transitory computer-readable medium having computer-executable instructions stored thereon that, upon execution, cause one or more processors to perform operations comprising:

receive, by a proxy server, ingress traffic from a client device and/or a response to the ingress traffic from a backend service;

forward, by the proxy server, the ingress traffic and/or the response to the ingress traffic to a gateway agent;

validate, by the gateway agent, the ingress traffic and/or the response to the ingress traffic as valid ingress traffic and/or valid response to the ingress traffic or invalid ingress traffic and/or invalid response to the ingress traffic based on predetermined validation requirements, the predetermined validation requirements comprise a request schema and a response schema, the request schema comprises one or more of headers, query parameters, or a body, and the response schema comprises one or more of headers or a body;

receive, by the proxy server, the valid ingress traffic and/or the valid response to the ingress traffic or the invalid ingress traffic and/or the invalid response to the ingress traffic from the gateway agent; and forward, by the proxy server, the valid ingress traffic to the backend service and/or forward the valid response to the ingress traffic to the client device or block the invalid ingress traffic and/or he invalid response to the ingress traffic, wherein the ingress traffic includes a request from the client device, and wherein the backend service is configured to send a response to the valid ingress traffic, and the computer-executable instructions, upon execution, further cause the one or more processors to temporarily store the request from the client device until the response to the valid ingress traffic is received.

13. The non-transitory computer-readable medium of claim 12, wherein the computer-executable instructions, upon execution, further cause the one or more processors to translate, by the proxy server, a request of a uniform resource locator (URL) in the ingress traffic into a corresponding backend locator composed of one or more of a service name, a cluster name, an environment name, and a region.

14. The non-transitory computer-readable medium of claim 12, wherein the computer-executable instructions, upon execution, further cause the one or more processors to establish a websocket computer communications protocol between the client device and the backend service.

* * * * *